Dec. 20, 1960 K. H. SCHÜTZ 2,965,012
OPTICAL SYSTEM WITH DIAPHRAGM PRESELECTOR
Filed Oct. 28, 1957

Karl Heinz Schütz
INVENTOR.

BY

AGENT.

2,965,012
Patented Dec. 20, 1960

2,965,012

OPTICAL SYSTEM WITH DIAPHRAGM PRESELECTOR

Karl Heinz Schütz, Kreuznach, Germany, assignor to Jos. Schneider & Co., Optische Werke, Kreuznach, Germany, a German firm Filed Oct. 28, 1957, Ser. No. 692,936

Claims priority, application Germany Nov. 2, 1956

1 Claim. (Cl. 95—64)

My present invention relates to optical systems for photographic cameras of the general type disclosed, for example, in commonly assigned U.S. Patent No. 2,803,182, issued August 20, 1957, to F. Werner, in which an adjustable diaphragm is normally maintained in an extreme (wide-open) position and is adapted to be momentarily placed in a preselected operating position by the actuation of a control element such as a shutter-trip button.

An object of the present invention is to provide an improved diaphragm-preselector system in which a small axial displacement of an operating member mounted in the objective housing will suffice to bring about a desired adjustment of the diaphragm.

Another object of my invention is to provide a preselector mechanism for the purpose described which is simple, compact and dependable in operation.

A feature of this invention resides in the use of a spring-loaded operating member which, when displaced against the force of its restoring spring, releases a diaphragm-control element which under the action of a second spring is then moved into a predetermined position of adjustment. As the second spring is weaker than the first-mentioned restoring spring, the latter will return the system to its normal position when the operating member is left to itself.

According to a more specific feature, the diaphragm-control element is a rotatable ring concentric with the objective and is coupled with the operating member via a transmission means, such as a bell-crank lever, adapted to translate an axial displacement of the latter into an angular movement of the former.

The invention will be described in greater detail with reference to the accompanying drawing in which.

At $a$ I have shown an objective housing in which there is rotatably mounted an annular cam $b$ similar to the disc 2 of the aforementioned Werner patent. A knob $b'$, projecting outwardly through a slot in housing $a$, enables the adjustment of disc $b$ to a position corresponding to a desired diaphragm stop. One of the iris leaves $d''$ of a conventional diaphragm $d$, pivoted at $o''$ to a mounting ring $q$, is provided with a spur $c$ adapted to co-operate with the contoured inner surface of cam $b$ in the establishment of a selected diaphragm position.

An operating pin $e$ is slidable in axial direction of housing $a$ and is provided with a cross bar $e'$ normally urged by a restoring spring $f$ against a portion of the housing. A trip lever $g$, pivoted at $r$ to a portion of the camera (not shown) carrying the objective housing $a$, is formed at one end with a rounded lug $g'$ adapted to displace the head of pin $e$ against the force of spring $f$ when a shutter-release button $g''$ at the other end of lever $g$ is manually depressed.

Figure 1:
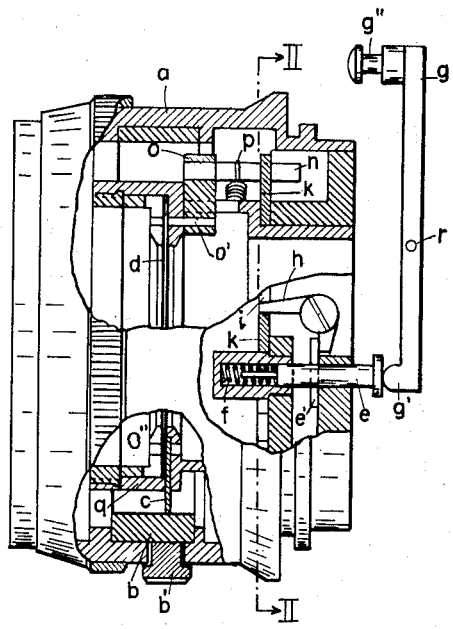
Fig. 1 is a side-elevational view, partly in section, of an objective system embodying the invention.
Figure 2:
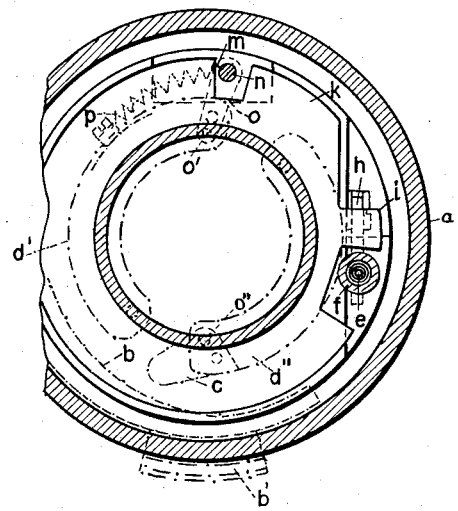
Fig. 2 is a cross-sectional view taken on the line II—II of Fig. 1.

A bell-crank lever $h$ has a short arm in engagement with cross bar $e'$ and has a long arm received in a recess $i$ of a control ring $k$ rotatably mounted within housing $a$. Another iris leaf $d'$, pivoted onto ring $q$ at $o'$, is provided with a spur $o$ from which a stud $n$ extends into a cutout $m$ of ring $k$. A tension spring $p$, weaker than compression spring $f$, is anchored to a fixed portion of housing $a$ and to stud $n$ in a sense tending to swing the leaf $d'$ and its spur $o$ counterclockwise about pivot $o'$ as viewed in Figs. 2 and 4, such movement being normally prevented by the ring $k$ held locked in the position of Figs. 1 and 2 by the lever $h$.

Figure 3:
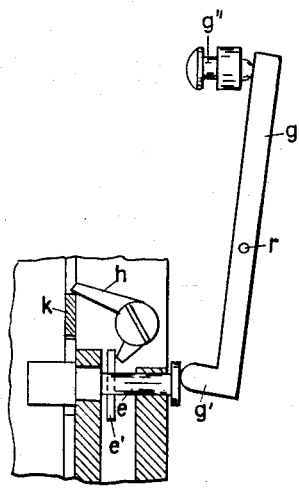
Fig. 3 is a side-elevational veiw of some of the elements of Fig. 1 in an operated position.
Figure 4:
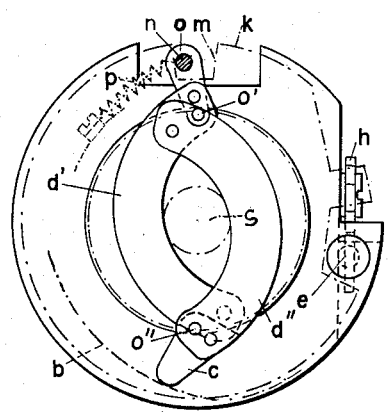
Fig. 4 is an axial view, similar to Fig. 2, of the principal parts of the mechanism in operated position.

In operation, pressure upon button $g''$ axially displaces the pin $e$ into the position shown in Fig. 3 in which the spring $p$ is free to move the spur $o$ and, with it, the leaf $d'$ and the ring $k$ into the position illustrated in Fig. 4; as will be apparent in Fig. 3, this movement is accompanied by a slight rotation of bell-crank lever $h$ whose arms, however, do not pass out of engagement with cross bar $e'$ and slot $i$, respectively. The pivotal movement of leaf $d'$ is communicated, through their common mounting, to leaf $d''$ and to all the other iris leaves (not shown) of diaphragm $d$, this movement being arrested when the spur $c$ makes contact with the cam surface of annular member $b$. As a result, the diaphragm $d$ is adjusted to form an opening $s$ whose diameter is determined by the preliminary positioning of cam $b$ with the aid of knob $b'$. Upon the release of button $g''$, restoring spring $f$ returns all the parts to the position shown in Figs. 1 and 2 in which the diaphragm is again wide open and spur $c$ is lifted from the contoured surface of cam $b$.

The invention is, of course, not limited to the specific embodiment herein disclosed but may be realized in various modifications and adaptations without departing from the spirit and scope of the appended claim.

I claim:

In an optical objective system, in combination, a tubular objective housing, an adjustable iris diaphragm in said housing, a pin axially displaceable in said housing and provided with an abutment, first spring means tending to maintain said pin in a normal position, a control ring rotatable about the axis of said housing for adjusting the effective aperture of said diaphragm, said ring having a peripheral recess and a peripheral cutout, said diaphragm including a first iris leaf having an extension engaging said cutout, a bell-crank lever swingable in a plane transverse to the plane of rotation of said ring, said lever having one arm engaging said abutment and another arm engaging said peripheral recess for normally locking the latter in a position of wide-open diaphragm adjustment, preselector means adapted to be set to a selected position corresponding to a desired diaphragm adjustment, said preselector means comprising a cam rotatable about said axis, rotation-limiting means coupled with said ring and adapted to co-act with said preselector means in an operative position of said ring representing the desired diaphragm adjustment, said rotation-limiting means comprising a second iris leaf of said diaphragm having an extension positioned for contact with said cam, and second spring means urging said ring into said operative position, said first spring means being stronger than said second spring means whereby the latter can establish said operative position only upon a displacement of said pin against the force of said first spring means to an extent sufficient to release said ring from said position of wide-open diaphragm adjustment.

References Cited in the file of this patent

UNITED STATES PATENTS

| | | |
|---|---|---|
| 2,803,182 | Werner | Aug. 20, 1957 |

FOREIGN PATENTS

| | | |
|---|---|---|
| 937,925 | France | Mar. 22, 1948 |
| 891,187 | Germany | Sept. 24, 1953 |
| 1,117,941 | France | May 29, 1956 |